(12) United States Patent (10) Patent No.: US 7,913,021 B2
Hofmann et al. (45) Date of Patent: Mar. 22, 2011

(54) SCALABLE BUS STRUCTURE

(75) Inventors: Richard Gerard Hofmann, Cary, NC (US); Mark Michael Schaffer, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/565,041

(22) Filed: Nov. 30, 2006

(65) Prior Publication Data

US 2007/0088894 A1 Apr. 19, 2007

Related U.S. Application Data

(63) Continuation of application No. 10/921,053, filed on Aug. 17, 2004, now Pat. No. 7,209,998.

(60) Provisional application No. 60/542,114, filed on Feb. 4, 2004.

(51) Int. Cl.
*G06F 13/14* (2006.01)
*G06F 13/00* (2006.01)
*G06F 13/28* (2006.01)

(52) U.S. Cl. ......... 710/305; 710/22; 710/110; 710/113; 710/310; 375/257; 370/276; 370/438; 370/395.1

(58) Field of Classification Search ................... 375/257; 370/276, 438, 395.1
See application file for complete search history.

(56) References Cited

U.S. PATENT DOCUMENTS

| | | | |
|---|---|---|---|
| 5,161,162 A * | 11/1992 | Watkins et al. | 714/43 |
| 5,303,227 A * | 4/1994 | Herold et al. | 370/276 |
| 5,418,785 A * | 5/1995 | Olshansky et al. | 370/438 |
| 5,450,547 A | 9/1995 | Nguyen et al. | |
| 5,699,540 A * | 12/1997 | Vanka et al. | 711/3 |

(Continued)

FOREIGN PATENT DOCUMENTS

GB 2362735 11/2001

(Continued)

OTHER PUBLICATIONS

IBM 64-Bit Processor Local Bus—Architecture Specifications, Version 3.5—May 2001—selected pages are attached (pp. 1, 2, 4, 32, 33, 52, 61)—entire specification can be obtained at the following website owned by IBM:http://www-3.ibm.com/chips/techlib/techlib.nsf/%20techdocs/8BA965C773B2E0ED87256AB20082CC9F*

(Continued)

*Primary Examiner* — Mark Rinehart
*Assistant Examiner* — Brian T Misiura
(74) *Attorney, Agent, or Firm* — Nicholas J. Pauley; Peter M. Kamarchik; Jonathan T. Velasco

(57) ABSTRACT

A processing system is disclosed with a sending component and a receiving component connected by a bus. The bus may be configured with first and second channels. The sending component may be configured to broadcast on the first channel read and write address information, read and write control signals, and write data. The sending component may also be configured to signal the receiving component such that the receiving component can distinguish between the read and write address information, the read and write control signals, and the write data broadcast on the first channel. The receiving component may be configured to store the write data broadcast on the first channel based on the write address information and the write control signals, retrieve read data based on the read address information and the read control signals, and broadcast the retrieved read data on the second channel.

27 Claims, 7 Drawing Sheets

U.S. PATENT DOCUMENTS

| | | | | |
|---|---|---|---|---|
| 5,752,076 | A * | 5/1998 | Munson | 710/5 |
| 5,812,878 | A * | 9/1998 | Christiansen et al. | 710/25 |
| 5,870,406 | A * | 2/1999 | Ramesh et al. | 714/709 |
| 5,925,118 | A * | 7/1999 | Revilla et al. | 710/110 |
| 5,926,831 | A * | 7/1999 | Revilla et al. | 711/137 |
| 5,944,805 | A | 8/1999 | Ricks et al. | |
| 5,991,841 | A * | 11/1999 | Gafken et al. | 710/104 |
| 6,081,860 | A * | 6/2000 | Bridges et al. | 710/110 |
| 6,167,475 | A * | 12/2000 | Carr | 710/113 |
| 6,427,193 | B1 | 7/2002 | Hughes et al. | |
| 6,430,641 | B1 * | 8/2002 | Hofmann et al. | 710/240 |
| 6,466,825 | B1 * | 10/2002 | Wang et al. | 700/5 |
| 6,542,976 | B2 * | 4/2003 | Barth et al. | 711/167 |
| 6,594,712 | B1 | 7/2003 | Pettey et al. | |
| 6,629,166 | B1 | 9/2003 | Grun | |
| 6,654,836 | B1 * | 11/2003 | Misra et al. | 710/110 |
| 6,772,254 | B2 * | 8/2004 | Hofmann et al. | 710/110 |
| 6,832,117 | B1 * | 12/2004 | Miyamori | 700/2 |
| 6,842,816 | B1 * | 1/2005 | Primrose | 710/305 |
| 7,035,958 | B2 | 4/2006 | Augsburg et al. | |
| 7,076,595 | B1 * | 7/2006 | Dao et al. | 710/317 |
| 7,136,953 | B1 | 11/2006 | Bisson et al. | |
| 7,191,271 | B2 * | 3/2007 | Andre | 710/119 |
| 7,209,998 | B2 * | 4/2007 | Hofmann et al. | 710/305 |
| 7,782,325 | B2 | 8/2010 | Gonzalez et al. | |
| 2003/0112805 | A1 * | 6/2003 | Stanton | 370/395.1 |
| 2004/0068603 | A1 * | 4/2004 | Augsburg et al. | 710/310 |
| 2005/0172063 | A1 * | 8/2005 | Hofmann et al. | 710/306 |
| 2005/0182884 | A1 * | 8/2005 | Hofmann et al. | 710/305 |
| 2005/0198416 | A1 * | 9/2005 | Kim | 710/100 |
| 2006/0047914 | A1 * | 3/2006 | Hofmann et al. | 711/137 |
| 2006/0136615 | A1 * | 6/2006 | Hofmann et al. | 710/33 |
| 2007/0088894 | A1 * | 4/2007 | Hofmann et al. | 710/305 |

FOREIGN PATENT DOCUMENTS

| | | |
|---|---|---|
| JP | 63-146148 | 6/1988 |
| JP | 10-289202 | 10/1998 |
| JP | 2001-265711 | 9/2001 |
| JP | 2001-282712 | 10/2001 |
| JP | 2004-252705 | 9/2004 |

OTHER PUBLICATIONS

InfiniBand Trade Association, InfiniBand Architecture Specification vol. 1, Release 1.0.a, Jun. 19, 2001, pp. 2, 38-46.

International Search Report—PCT/US05/003789, International Search Authority—European Patent Office, Jun. 30, 2005.

International Preliminary Report on Patentability-PCT/US05/003789, IPEA/US-Apr. 17, 2006.

Written Opinion-PCT/US05/003789, International Search Authority-European Patent Offce-Jun. 30, 2005.

European Search Report-EP09177248, Munich-Feb. 3, 2010.

* cited by examiner

SCALABLE BUS STRUCTURE

RELATED APPLICATION

This application is a continuation of prior application Ser. No. 10/921,053, filed Aug. 17, 2004 now U.S. Pat. No. 7,209,998 which claims the benefit of U.S. Provisional Ser. No. 60/542,114, filed Feb. 4, 2004.

BACKGROUND

1. Field

The present disclosure relates generally to digital systems, and more specifically, to a scalable bus structure.

2. Background

Computers have revolutionized the electronics industry by enabling sophisticated processing tasks to be performed quickly. These sophisticated tasks may be performed by systems containing a high number of complex components that communicate with one another in a fast and efficient manner using a bus. A bus is a channel or path between components in a computer, a computer subsystem, a computer system, or other electronic system.

Many buses resident in a computer have traditionally been implemented as shared buses. A shared bus provides a means for any number of components to communicate over a common path or channel. In recent years, shared bus technology has been supplemented by point-to-point switching connections. Point-to-point switching connections provide a direct connection between two components on the bus while they are communicating with each other. Multiple direct links may be used to allow several components to communicate at the same time.

A common configuration for a computer includes a microprocessor with system memory. A high bandwidth system bus may be used to support communications between the two. In addition, there may also be a peripheral bus which is used to transfer data to peripherals. In some cases, there may also be a configuration bus which is used for the purpose of programming various resources. Bridges may be used to efficiently transfer data between the higher and lower bandwidth buses, as well as provide the necessary protocol translation. Each of these buses has been implemented with different protocols and may have a wide variation in performance requirements between them.

The use of multiple bus structures in a computer has provided a workable solution for many years. However, as area and power emerge as the major design considerations for integrated circuits, it is becoming increasingly desirable to reduce the complexity of the bus structure.

SUMMARY

In one aspect of the present invention, a method of communicating between a sending component and a receiving component over a bus includes broadcasting from the sending component on a first channel of the bus read and write address information, read and write control signals, and write data. The method also includes signaling from the sending component to the receiving component such that the receiving component can distinguish between the read and write address information, the read and write control signals, and the write data broadcast on the first channel. The method further includes storing the write data broadcast on the first channel at the receiving component based on the write address information and the write control signals, retrieving read data from the receiving component based on the read address information and the read control signals, and broadcasting from the receiving component the retrieved read data on the second channel.

In another aspect of the present invention, a processing system includes a bus having first and second channels. The processing system also includes a sending component configured to broadcast on the first channel read and write address information, read and write control signals, and write data. The processing system further includes a receiving component configured to store the write data broadcast on the first channel based on the write address information and the write control signals, retrieve read data based on the read address information and the read control signals, and broadcast the retrieved read data on the second channel to the sending component. The sending component is further configured to signal the receiving component such that the receiving component can distinguish between the read and write address information, the read and write control signals, and the write data broadcast on the first channel.

In yet another aspect of the present invention, a processing system includes a bus having first and second channels. The processing system also includes sending means for broadcasting on the first channel read and write address information, read and write control signals, and write data. The processing system further includes receiving means for storing the write data broadcast on the first channel based on the write address information and the write control signals, retrieving read data based on the read address information and the read control signals, and broadcasting the retrieved read data on the second channel to the sending component. The sending means further includes means for signaling the receiving means such that the receiving means can distinguish between the read and write address information, the read and write control signals, and the write data broadcast on the first channel.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

Various components in a processing system may communicate over a bus. The bus may be scalable in terms of width and clock frequency to support the bandwidth requirements of the various components. The bus may also use a common architecture and signaling protocol for all scalable configurations. This may be achieved by reducing the signaling protocol of the bus to only those signals necessary to either transmit or receive information.

The bus may be configured with a "transmit channel" that provides a generic medium for broadcasting information from a sending component to a receiving component using the same signaling protocol in a time division multiplexed fashion. A "receive channel" may also use the same signaling protocol to broadcast information from the receiving component to the sending component.

Figure 1:
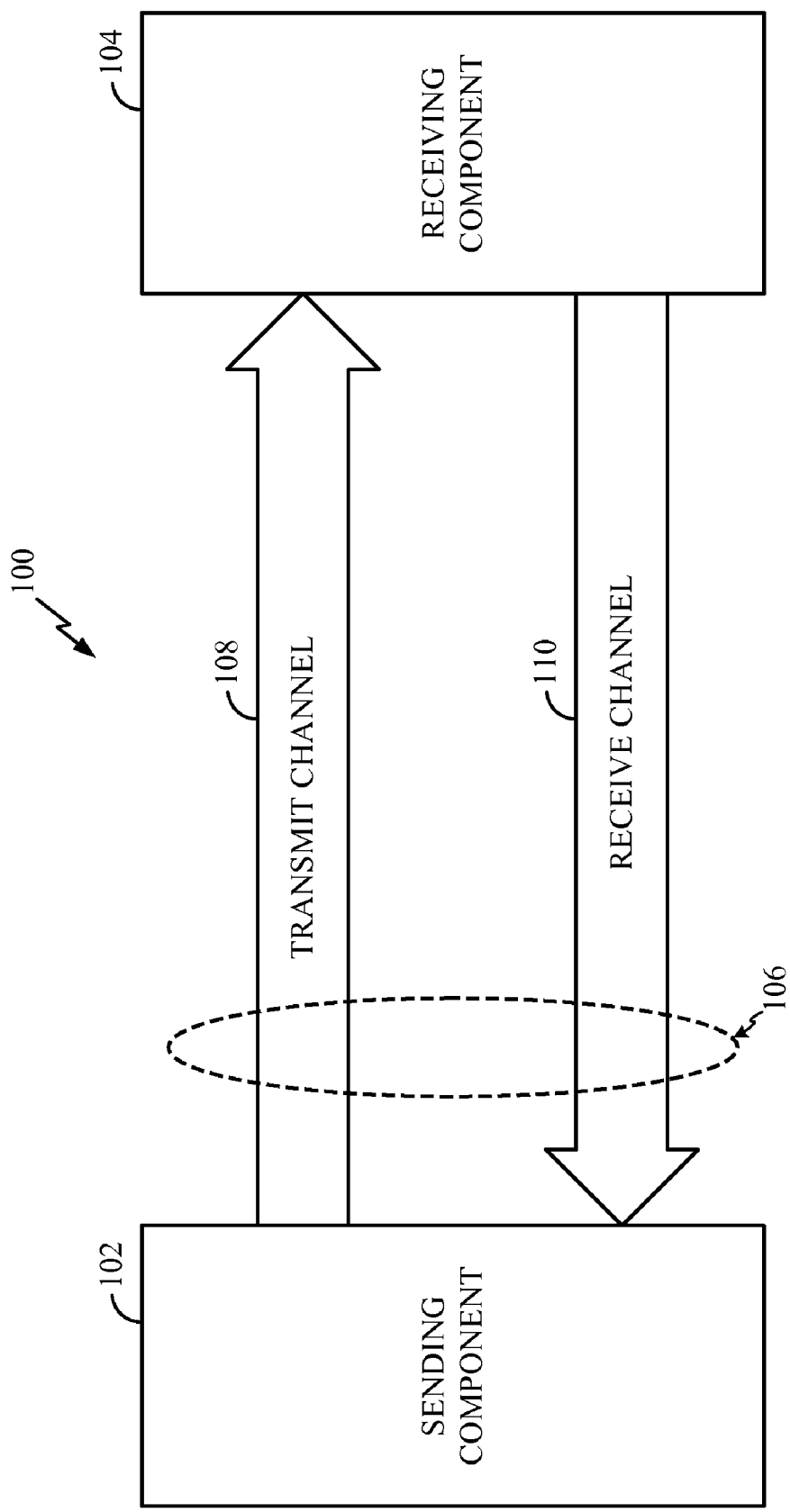
FIG. 1 is a conceptual block diagram illustrating an example of a point-to-point connection over a two channel bus between two components in a processing system.

FIG. 1 is a conceptual block diagram illustrating this fundamental concept. A point-to-point connection over a bus between two components is shown in a processing system. The processing system 100 may be a collection of components that cooperate to perform one or more processing functions. Typically, the processing system will be a computer, or resident in a computer, and capable of processing, retrieving and storing information. The processing system may be a stand-alone system. Alternatively, the processing system may be embedded in any device, including by way of example, a cellular telephone.

In one embodiment of the processing system 100, the bus 106 is a dedicated bus between the sending component 102 and the receiving component. In another embodiment of the processing system 100, the sending component 102 communicates with the receiving component 104 with a point-to-point connection over the bus 106 through a bus interconnect (not shown). Moreover, as those skilled in the art will readily appreciate, the inventive aspects described throughout this disclosure are not limited to a dedicated bus or point-to-point switching connection, but may be applied to any type of bus technology including, by way of example, a shared bus.

The sending component 102 may be any type of bus mastering component including, by way of example, a microprocessor, a digital signal processor (DSP), a direct memory access controller, a bridge, a programmable logic component, discrete gate or transistor logic, or any other information processing component.

The receiving component 104 may be any storage component, including, by way of example, registers, memory, a bridge, or any other component capable of retrieving and storing information. The storage capacity at each address location of the receiving component may vary depending on the particular application and the overall design constraints. For the purposes of explanation, the receiving component will be described with a storage capacity of 1-byte per address location.

The sending component 102 may read from or write to the receiving component 104. In the case where the sending component 102 writes to the receiving component 104, the sending component may broadcast an address location, the appropriate control signals, and the payload to the receiving component 104 on the transmit channel 108. The "payload" refers to the data associated with a particular read or write operation, and in this case, a write operation.

The control signals may include transfer qualifiers. The term "transfer qualifier" refers to a parameter that describes an attribute of a read operation, a write operation, or another bus related operation. In this case, the transfer qualifiers may include a "payload size signal" to indicate the number of data bytes contained in the payload. If the payload is multiple bytes, then the receiving component 104 may store the payload in a block of sequential address locations beginning with the address location broadcast on the transmit channel 108. By way of example, if the sending device 102 broadcasts an address location $100_{HEX}$ followed by a 4-byte payload, the receiving component 104 may write the payload to a block of sequential address locations starting at $100_{HEX}$ and ending at $103_{HEX}$.

The control signals may also include write byte enables. "Write byte enables" may be used to indicate which byte lanes on the transmit channel 108 will be used to broadcast the payload for a write operation. By way of example, a 2-byte payload broadcast on an 32-bit transmit channel 108 may use 2 of the 4 byte lanes. The write byte enables may be used to indicate to the receiving component 104 which of the 2 byte lanes on the transmit channel 108 will be used to broadcast the payload.

In the case where the sending component 102 reads from the receiving component 104, the address location and the appropriate transfer qualifiers may be the only information that needs to be broadcast on the transmit channel 108. The transfer qualifiers may include a payload size signal to indicate the number of data bytes contained in the payload. The receiving component 104 may acknowledge the broadcast and send the payload on the receiving channel 110. If the payload is multiple bytes, then the receiving component 104 may read the payload from a block of sequential address locations beginning with the address location broadcast on the transmit channel 108. By way of example, if the sending device 102 broadcasts an address location $200_{HEX}$ and requests a 4-byte payload, the receiving component 104 may retrieve the payload from a block of sequential address locations starting at $200_{HEX}$ and ending at $203_{HEX}$.

In the embodiment of the processing system described thus far, the sending component 102 has total control of the transmit channel 108 and may broadcast one or more address locations with their associated control signals prior to, during, or after an active write operation. Also, the transmit and receive channels 108 and 110 are totally independent, and thus, the broadcasting of address locations, control signals, and write data by the sending component may coincide with the broadcasting of read data by the receiving component 104. "Write data" refers to data broadcast by the sending component 102, and "read data" refers to data read from the receiving component 104 and broadcast on the receiving channel 110.

An implicit addressing scheme may be used to control the sequence of read and write data operations on the transmit and receive channels 108 and 110. By way of example, if the sending component 102 initiates multiple write operations by broadcasting a series of address locations with the appropriate control signals on the transmit channel 108, the sending component 102 will broadcast the payload for each write operation in the same sequence in which the address locations are broadcast. Similarly, if the sending component 102 initiates multiple read operations by broadcasting a series of address locations with the appropriate control signals, the receiving component 104 will retrieve the payload for each read operation in the same sequence in which it receives the address locations.

"Transfer tags" may be used as an alternative to this implicit addressing scheme. The sending component 102 may assign a transfer tag for each read and write operation. The transfer tag may be included in the transfer qualifiers broadcast on the transmit channel 108. In the case of a write operation, the sending component 102 may send the transfer tag with the payload, and the receiving component 104 may use the transfer tag recovered from the transfer qualifiers to identify the payload. In the case of a read operation, the receiving component 104 may send the recovered transfer tag with the payload, and the sending component may use the transfer tag to identify the payload.

The various concepts described thus far may be implemented using any number of protocols. In the detailed description to follow, an example of a bus protocol will be presented. This bus protocol is being presented to illustrate the inventive aspects of a processing system, with the understanding that such inventive aspects may be used with any suitable protocol. The basic signaling protocol for the transmit channel is shown below in Table 1. Those skilled in the art will readily be able to vary and/or add signals to this protocol in the actual implementation of the bus structure described herein.

TABLE 1

| Signal | Definition | Driven By |
| --- | --- | --- |
| Clock | the reference clock signal | system |
| Valid | valid information is being broadcast on the transmit channel | sending component |
| Type (2:0) | indicates the type of information being broadcast | sending component |
| Transfer Ack | indicates receiving component is ready to receive write data | receiving component |
| Transmit Channel | channel driven by the sending component to broadcast information | sending component |

The same signaling protocol may be used for the receive channel as shown below in Table 2.

TABLE 2

| Signal | Definition | Driven By |
| --- | --- | --- |
| Clock | the reference clock signal | system |
| Valid | valid information is being broadcast on the receive channel | Receiving component |

TABLE 2-continued

| Signal | Definition | Driven By |
| --- | --- | --- |
| Type (2:0) | Indicates the type of information being broadcast | Receiving component |
| Transfer Ack | indicates sending component is ready to receive read data | sending component |
| Receive Channel | channel driven by the receiving component to broadcast information | Receiving component |

The definition of the Type field used in this signaling protocol is shown in Table 3.

TABLE 3

| Type Value | Definition |
| --- | --- |
| 000 | Reserved |
| 001 | Valid Write Address Location |
| 010 | Valid Write Control Signals |
| 011 | Valid Write Data |
| 100 | Reserved |
| 101 | Valid Read Address Location |
| 110 | Valid Read Control Signals |
| 111 | Valid Read Data |

The definition of the Valid and Transfer Ack signals in this signaling protocol is shown in Table 4.

TABLE 4

| Valid; Transfer Ack | Definition |
| --- | --- |
| 0; 0 | Valid information is not being broadcast, and the component at the other end is not ready to receive a broadcast |
| 0; 1 | Valid information is not being broadcast, but the component at the other end is ready to receive a broadcast |
| 1; 0 | Valid information is being broadcast, but the component at the other end is not ready to receive a broadcast |
| 1; 1 | Valid information is being broadcast, and the component at the other end is ready to receive a broadcast |

Figure 2:
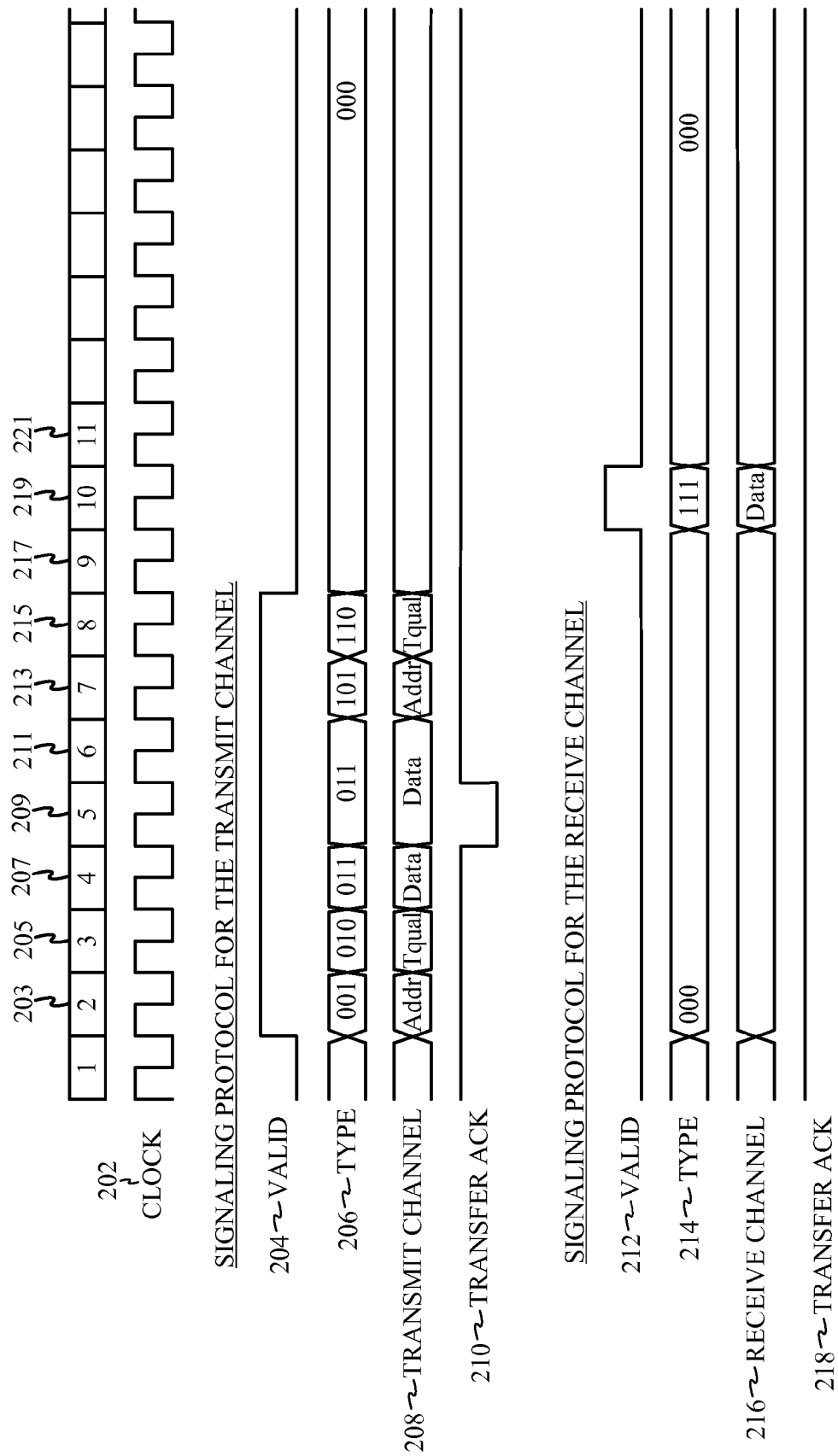
FIG. 2 is a timing diagram showing a read and write operation between two components in a processing system having a point-to-point connection over a two channel bus.

FIG. 2 is a timing diagram illustrating a read and write operation over a 32-bit transmit channel and a 32-bit receive channel. A System Clock 202 may be used to synchronize communications between the sending component and the receiving component. The System Clock 202 is shown with eleven clock cycles, with each cycle numbered sequentially for ease of explanation.

A write operation may be initiated by the sending component during the second clock cycle 203. This may be achieved by asserting the Valid signal 204 and setting the Type field 206 to signal a broadcast of an address location for a write operation. The address location may also be broadcast over the Transmit Channel 208 to the receiving component. In response to this broadcast, the receiving component stores the address location in its address queue.

The broadcast of the address location may be followed by a control signal broadcast for the write operation in the third clock cycle 205. The sending component may alert the receiving component of the control signal broadcast by keeping the Valid signal 204 asserted and changing the Type field 206 appropriately. The control signal broadcast may include the transfer qualifiers and the write byte enables for the write operation. In this case, the transfer qualifiers may include a payload size signal indicating an 8-byte payload. The write byte enables may indicate that the 8-byte payload will be transmitted on all byte lanes of the Transmit Channel 208.

The receiving component may determine from this information that the payload broadcast will be broadcast over two clock cycles.

The first 4-bytes of the payload for the write operation may be broadcast on the Transmit Channel 208 during the fourth clock cycle 207. The sending component may alert the receiving component of the payload broadcast by keeping the Valid signal 204 asserted and changing the Type field 206 to signal a payload broadcast. In the absence of transfer tags, the receiving component recognizes the write data as the first 4-bytes of the payload based on the implicit addressing scheme discussed earlier. In response to this broadcast, the first 4-bytes of the payload may be written to the receiving component.

In the following clock cycle 209, the Valid signal 204 and the Type field 206 remains unchanged as the second 4-bytes of the payload is broadcast on the Transmit Channel 208. However, the receiving component has disserted the Transfer Ack signal 210 indicating that it cannot accept the broadcast. The sending component may detect that the Transfer Ack signal 210 is not asserted at the end of this fifth clock cycle 209, and repeat the broadcast of the second 4-bytes of the payload in the following clock cycle 211. The sending component may continue to broadcast the second 4-bytes of the payload every clock cycle until the sending component detects the assertion of the Transfer Ack signal 210 from the receiving component. In this case, only one repeat broadcast is required. The second 4-bytes of the payload may be written to the receiving component in the sixth clock cycle. At the end of the sixth clock cycle 211, the sending component detects the assertion of the Transfer Ack signal 210, and determines that the broadcast has been received.

A read operation may be initiated by the sending component during the seventh clock cycle 213. This may be achieved by asserting the Valid signal 204 and setting the Type field 206 to signal the broadcast of an address location for a read operation. The address location may then be broadcast over the Transmit Channel 208 to the receiving component. In response to this broadcast, the receiving component stores the address location in its address queue.

The broadcast of the address location may be followed by a control signal broadcast for the read operation in the eighth clock cycle 215. The sending component may alert the receiving component of the control signal broadcast by keeping the Valid signal 204 asserted and changing the Type field 206 appropriately. The control signal broadcast may include the transfer qualifiers for the read operation. In this case, the transfer qualifiers may include a payload size signal indicating a 4-byte payload. The receiving component may determine from this information that the payload broadcast can be broadcast over one clock cycle.

Due to the read latency of the receiving component, a several clock cycle delay may be experienced before the read data is available. Once the 4-byte payload is available, the receiving component may assert the Valid signal 212 and assert the Type field 214 signaling a payload broadcast on the Receive Channel 216. Since the Transfer Ack signal 218 is asserted by the sending component, the broadcast of the payload may be completed in one clock cycle. The receiving component detects the assertion of the Transfer Ack signal 218 at the end of the tenth clock cycle 219, and thereby determines that the broadcast of the payload was successful.

Figure 3:
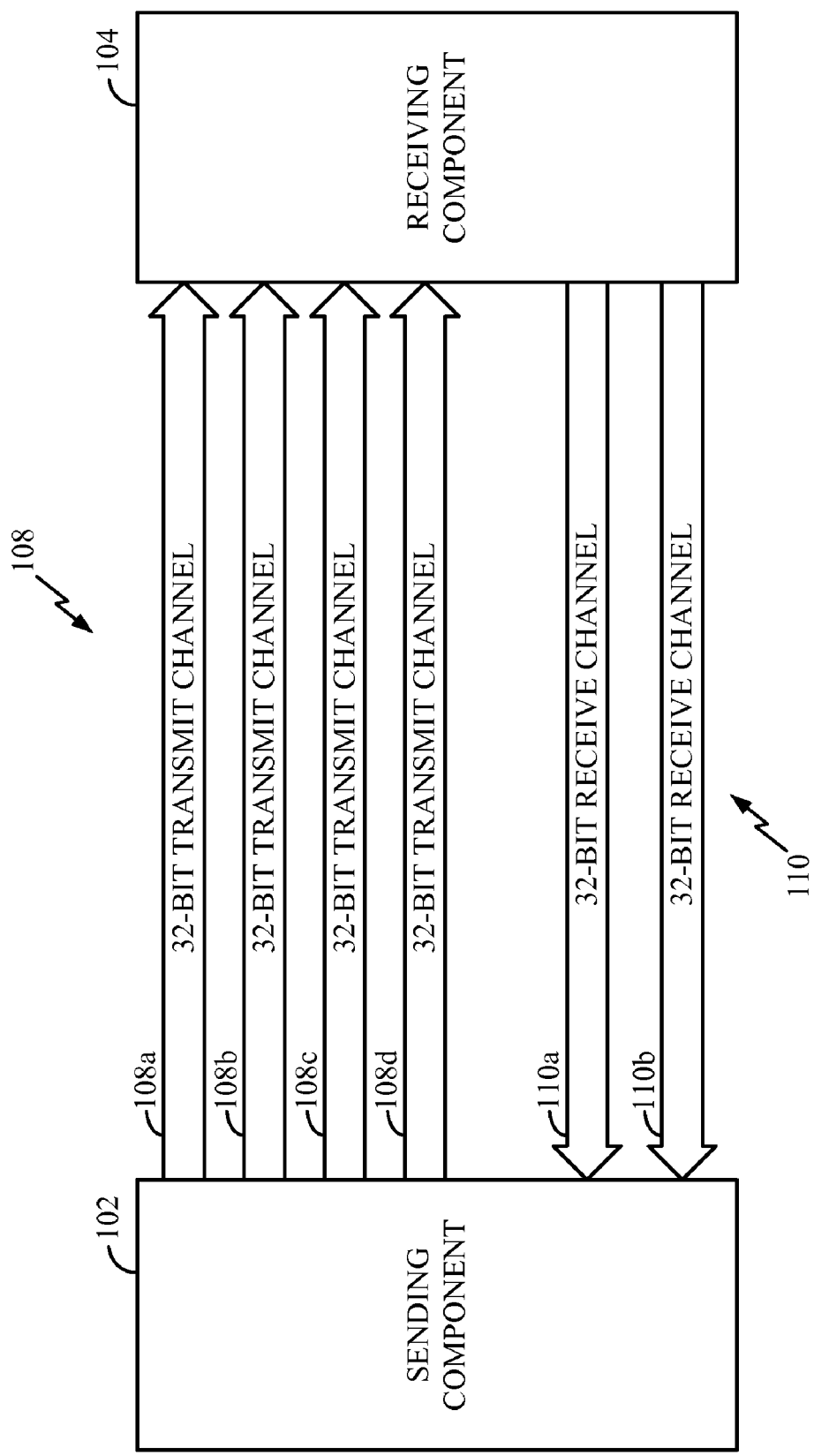
FIG. 3 is a conceptual block diagram illustrating an example of a point-to-point connection over a high performance two channel bus between two components in a processing system.

FIG. 3 is conceptual block diagram illustrating a point-to-point connection between two components over a high performance bus. The transmit and receive channels 108 and 110 of the high performance bus may be implemented as multiple sub-channels with each sub-channel being 32-bits wide. In actual implementations, the number of sub-channels and the width of each sub-channel may vary depending on the performance requirements of the particular application. In this example, the transmit channel includes 4 32-bit sub-channels 108a-108d, and the receive channel includes 2 32-bit sub-channels 110a-110b. This implementation may be suitable, by way of example, for a system bus in a computer, or any other high performance bus. The term "sub-channel" refers to a group of wires or conductors which may be controlled independently of the other wires or conductors in the channel. This means that each sub-channel may be provided with independent signaling capability.

This high performance bus may be used by the sending component 102 to simultaneously broadcast several combinations of information. By way of example, the sending component may broadcast a 32-bit address location, 32-bits of control signals including transfer qualifiers and write byte enables, and 8-bytes of write data within a single clock cycle. In the case of the receive channel 110, 8-bytes of read data may be broadcast from the receiving component 104 to the sending component 102 within a single clock cycle.

Since the various embodiments of the processing system described thus far do not include any other type of information broadcast on the receive channel 110 other than read data, there is no need for sub-channels. A single 64-bit receive channel may be implemented to reduce the signaling requirements (i.e., no sub-channels). However, in some embodiments of the processing system, the Type field in the signaling protocol may be extended to allow for the broadcast of other information. By way of example, a "write response" may be broadcast on the receive channel 110 to signal the sending component that the data has been written to the receiving component 104. The write response could be broadcast on the receive channel 110 using one of the reserved Type fields. In that case, it may be useful to have two independently controlled 32-bit sub-channels so that read data and a write response may be broadcast on the receive channel 110 simultaneously. With 2 32-bit sub-channels, it may then be possible to simultaneously broadcast 4-bytes of read data, 2-bytes of read data and a 32-bit write response, or 2 32-bit write responses. A single 64-bit receive channel 110, on the other hand, may be only able to support read data or write responses in any given clock cycle.

In a similar manner, the transmit channel may also be extended to include the broadcast of other types of information that are common in many bus protocols, such as standard commands. By way of example, a microprocessor attached to a bus may need to broadcast information to other components in the system such as a TAB Sync command, or a TAB invalidate command. These commands may be classified in the Type field without the need for additional signaling.

Figure 4:
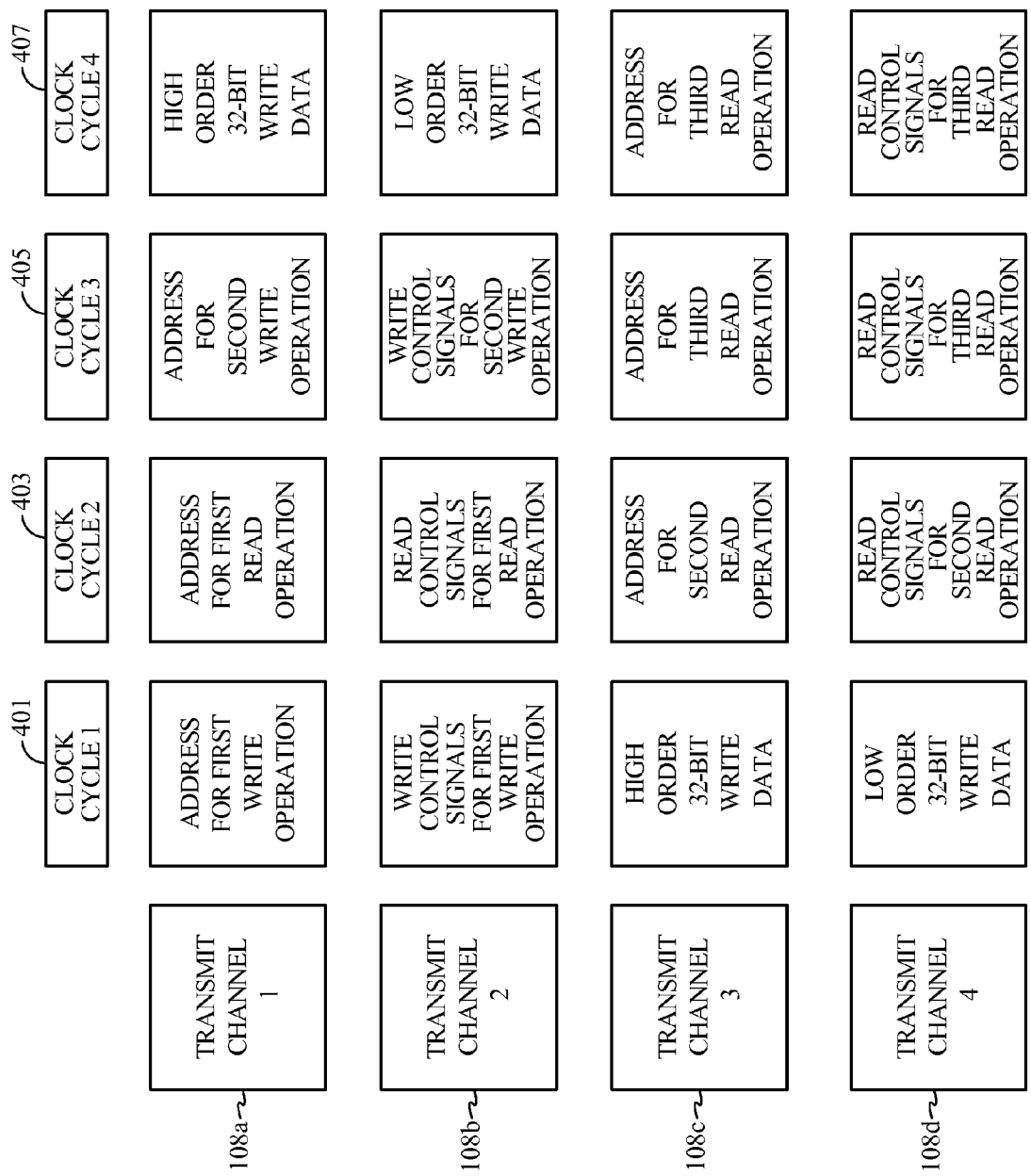
FIG. 4 is a conceptual block diagram illustrating the time division multiplexed nature of the high performance bus of FIG. 3.

FIG. 4 is a block diagram illustrating the time division multiplexed nature of a transmit channel 108 with 4 sub-channels 108a-108d. In this example, a complete 8-byte payload broadcast may be completed across the 4 sub-channels within a single clock cycle. More specifically, during the first clock cycle 401, the sending component may broadcast a 32-bit address location on the first sub-channel 108a and 32-bits of control signals on the second sub-channel 108b for the first write operation. The sending component may also broadcast, during the same clock cycle, the higher order 4-bytes of the payload on the third sub-channel 108c and the lower order 4-bytes of the payload on the fourth sub-channel 108d. Each sub-channel 108a-108d may be provided with independent signaling capability, and in the case described above, assert the Valid signal with the appropriate Type field for each sub-channel.

With the Transfer Ack asserted for each sub-channel 108*a*-108*d* at the end of the first clock cycle 401, two read operations may be initiated by the sending component during the second clock cycle 403. This may be achieved by broadcasting a 32-bit address location on the first sub-channel 108*a* and 32-bits of control signals on the second sub-channel 108*b* for the first read operation, with the appropriate signaling on each sub-channel 108*a*-108*b*. The sending component may also broadcast a 32-bit address location on the third sub-channel 108*c* and 32-bits of control signals on the fourth sub-channel 108*d* for the second read operation, again with the appropriate signaling for the sub-channels 108*c*-108*d*

With the Transfer Ack asserted for each sub-channel 108*a*-108*d* at the end of the second clock cycle, a second write operation and third read operation may be initiated by the sending component during the third clock cycle 405. This may be achieved by broadcasting a 32-bit address location on the first sub-channel 108*a* and 32-bits of control signals on the second sub-channel 108*b* for the second write operation, with the appropriate signaling on each sub-channel 108*a*-108*b*. The sending component may also broadcast a 32-bit address location on the third sub-channel 108*c* and 32-bits of control signals on the fourth sub-channel 108*d* for the third read operation, again with the appropriate signaling for the sub-channels 108*c*-108*d*.

In this example, at the end of the third clock cycle 405, the Transfer Ack signal is asserted on the first and second sub-channels 108*a* and 108*b*, but not on the third and fourth sub-channels 108*c* and 108*d*. The sending component may detect that the Transfer Ack on the third and fourth sub-channels 108*c* and 108*d* are not asserted, and thus, determine that the address location and the control signals for the third read operation should be rebroadcast. The address location and the control signals for the third read operation are shown being broadcast during the fourth clock 407 on the third and fourth sub-channels 108*c* and 108*d*, respectively, but may be rebroadcast on any sub-channels during any subsequent clock cycle.

In the above example, the receiving component is configured to either accept or reject both the address location and the control signals for the third read operation. However, in some embodiments of the processing system, the receiving component may be configured to accept the address location and reject the control signals, or vice versa, for the same read or write operation. Similarly, the receiving component may be configured to accept or reject the higher or lower order bytes of the payload individually. In this case, there needs to be a way to tie a rebroadcast of say the control signals for the third read operation to the address location for the same operation previously broadcast. This may be achieved in a variety of ways. By way of example, once an address location for a read or write operation is sent and acknowledged by the receiving component, the address for the next read or write operation is not broadcast until the control signals associated with the current read or write operation request is received and acknowledged by the receiving component.

During the fourth clock cycle 407, the sending component may broadcast the payload for the second write operation and attempt for the second time to initiate a third read operation. This may be achieved by broadcasting the higher order 4-bytes of the payload on the first sub-channel 108*a* and the lower order 4-bytes of the payload on the second sub-channel 108*b* for the second write operation, with the appropriate signaling on each sub-channel 108*a*-108*b*. The sending component may also rebroadcast the 32-bit address location on the third sub-channel 108*c* and 32-bits of control signals on the fourth sub-channel 108*d* for the third read operation.

In this high performance bus embodiment, the ordering of the read/write requests may be implicit by position. The sending component may broadcast the first read/write request on the first sub-channel 108*a*, the second read/write request on the second sub-channel 108*b*, the third read/write request on the third sub-channel 108*c*, and the fourth read/write request on the fourth sub-channel 108*d*. The receiving component may process the requests based on this implicit positioning in order to maintain sequential consistency. By way of example, if the address locations for the read and write operations initiated during the third clock cycle 405 are the same, the receiving component may wait until the data broadcast on the first and second sub-channels 108*a* and 108*b* during the fourth clock cycle 407 is written to the address location before providing the newly written data at this address location to the receive channel for transmission to the sending component.

In the embodiment of the high performance bus described thus far, the write data does not need to be broadcast immediately following the broadcast of the write operation request (i.e., the address location and control signals). Other higher priority read operation requests and/or commands may be interleaved with the write data broadcast on the transmit channel 108. However, if the sending component interleaves the read operation requests and/or commands with the write data, then the sending component should be configured with an address back-off mechanism.

As described earlier in connection with FIG. 2, the sending component samples the Transfer Ack signal 210 following a broadcast on the Transmit Channel 208. If the sending component fails to detect an asserted Transfer Ack signal 210, then it may repeat the broadcast during the following clock cycle. The broadcast may be repeated every clock cycle until the sending component detects an asserted Transfer Ack signal 210. A problem may arise when the address queue is full during a read operation request, and therefore, cannot accept any more address locations. At the same time, the receiving component needs to complete the pending write operation in order to free up space in the address queue. In this case, the receiving component is said to be deadlocked.

The address back-off mechanism is designed to allow the write operation to be completed when the receiving component is in deadlock. This may be achieved by limiting the number of repeat broadcasts by the sending component in connection with a read operation request. If the receiving component does not acknowledge a read operation request with a Transfer Ack signal within a certain number of clock cycles, then the sending component may abort the request by sending the remaining write data in place of the address location for the current read operation request. If there is not a pending write operation that needs to be completed, then the broadcast of the read operation request does not need to be aborted. The broadcast may continue until the receiving component acknowledges the request.

The address back-off mechanism may not be needed if the sending component does not interleave read operation requests with write data. That is, if the address location for a write operation is followed immediately by the control signals, and then immediately followed by the write data, then the receiving component will never encounter deadlock. However, this may degrade the performance of the receive channel because the sending component may not be able to keep the pipeline of read operations sufficient to fully utilize the bandwidth of the receive channel.

Figure 5:
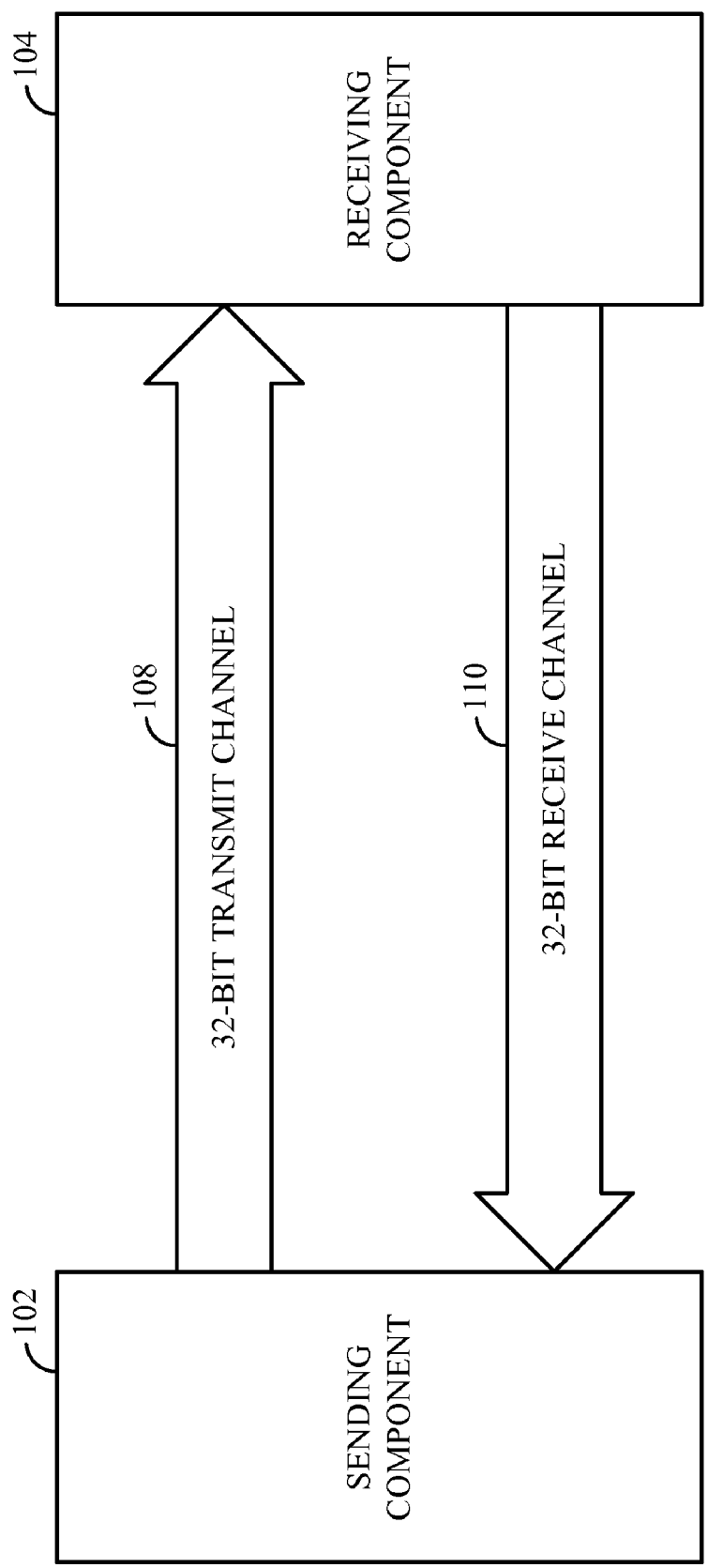
FIG. 5 is a conceptual block diagram illustrating an example of a point-to-point connection over a low bandwidth two channel bus between two components in a processing system.

FIG. 5 is a conceptual block diagram illustrating a point-to-point connection between two components over a low bandwidth bus. The low bandwidth bus may be implemented with a single transmit channel 108 and a single receive channel 110 requiring fewer signals and resulting in lower power dissipation. In the example shown in FIG. 5, the sending component 102 may broadcast information to the receiving component 104 over a 32-bit transmit channel 108, and the receiving component 104 may broadcast information back to the sending component 102 over a 32-bit receive channel 110. Alternatively, this same bus architecture may be implemented with narrower bus widths.

Figure 6:
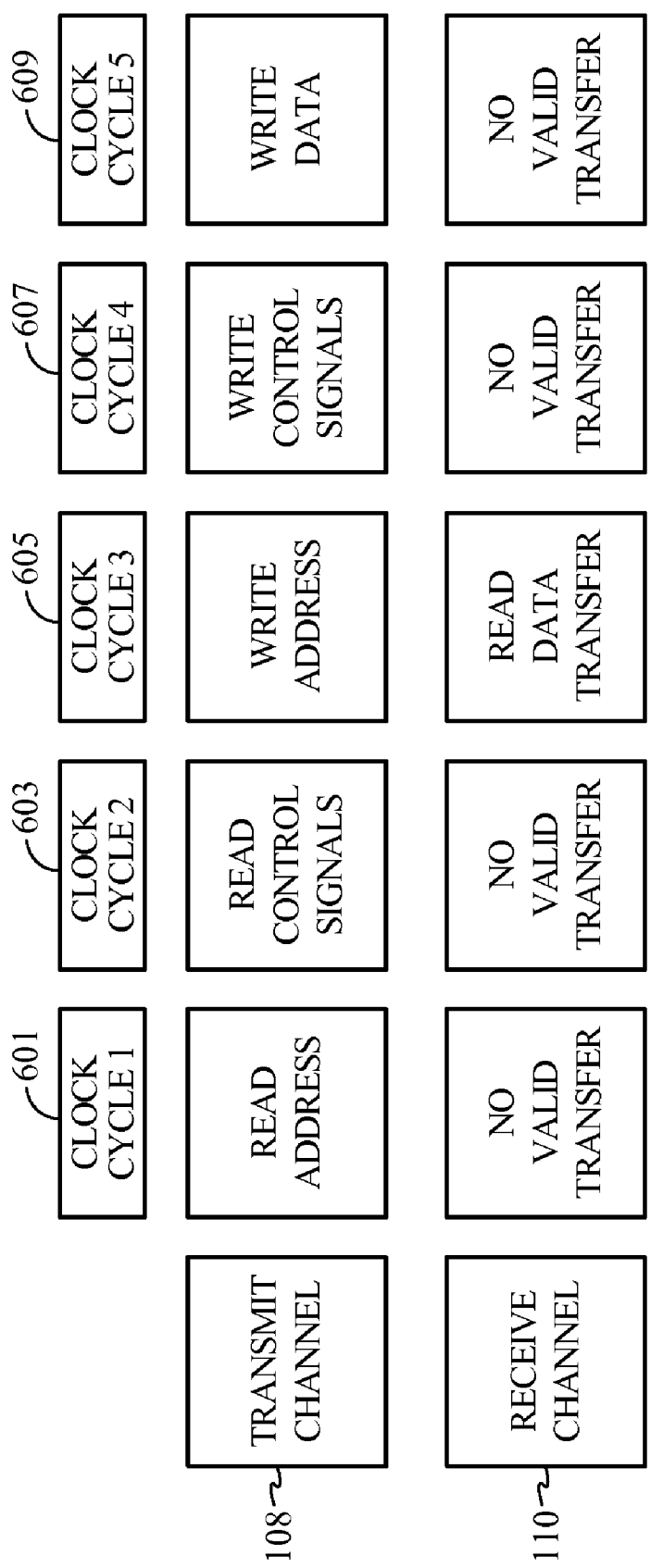
FIG. 6 is a conceptual block diagram illustrating the time division multiplexed nature of the low bandwidth bus of FIG. 5.

Although this configuration continues to allow for the transmit and receive channels 108 and 110 to broadcast information simultaneously, each read or write operation may now require multiple clock cycles as shown in the block diagram of FIG. 6. In this example, two clock cycles are used to initiate a read operation. More specifically, a 32-bit address location may be broadcast on the transmit channel 108 in the first clock cycle 601, followed by 32-bits of control signals in the following clock cycle 603. A 4-byte payload may be read from the receiving component in response to this request and broadcast on the receive channel 110 in the third clock cycle 605.

Concurrently with the broadcast of the payload on the receive channel, the sending component may initiate a write operation. In this case, the write operation uses three clock cycles. In the third clock cycle 605, the sending component broadcasts a 32-bit address location on the transmit channel 108, followed by 32-bits of control signals in the fourth clock cycle 607, followed by a 4-byte payload in the fifth clock cycle 609.

Figure 7:
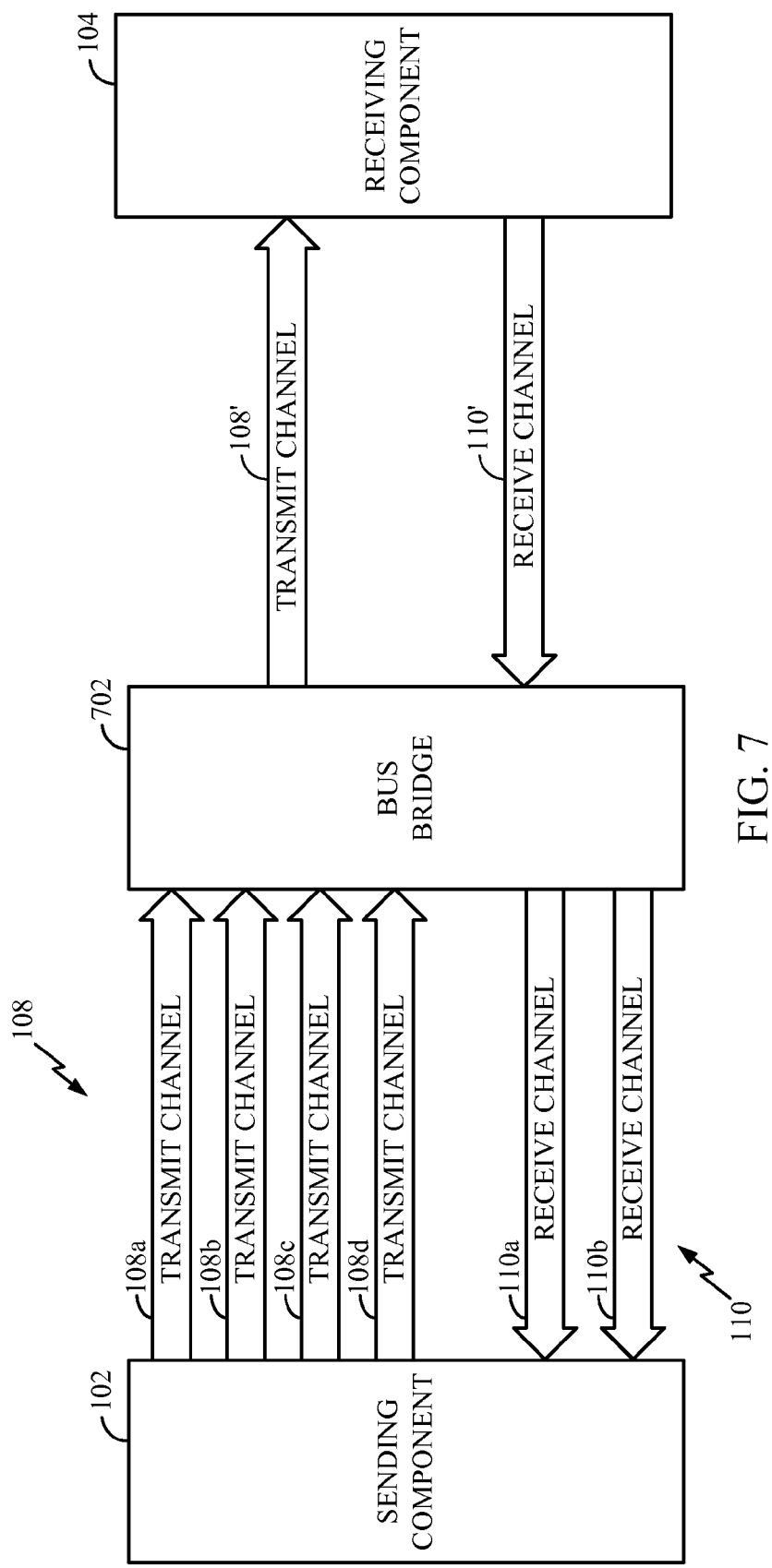
FIG. 7 is a conceptual block diagram illustrating an example of a point-to-point connection between a high performance component and a lower bandwidth component through a bridge.

In many processing systems, some devices may require a high bandwidth interconnect while others can sufficiently operate with a much lower bandwidth interconnect. By using a scalable bus architecture, the implementation of bridges may be implemented with a common signaling protocol. FIG. 7 is a conceptual block diagram illustrating a point-to-point connection between two components through a bridge. The bridge 702 may be used to interface a sending component 102 attached to a high performance bus to a receiving component 104 attached to a lower bandwidth bus. The high performance bus may be implemented with a transmit channel 108 having 4 32-bit sub-channels 108a-108d and a receive channel 110 having 2 32-bit receive channels 110a and 110b. The lower bandwidth bus may be implemented with a single 32-bit transmit channel 108' and a single 32-bit receive channel 110'.

In this example, a write operation may be completed between the sending device 102 and the bridge 702 within a single clock cycle using the 4 transmit sub-channels 108a-108d of the high performance bus to broadcast the address location, the control signals, and an 8-byte payload as described earlier in connection with FIGS. 3 and 4. The bridge 702 may buffer and broadcast the information to the receiving component 104 over the 32-bit transmit channel 108' of the lower bandwidth bus in 4 clock cycles as described earlier in connection with FIGS. 5 and 6.

In the case of a read operation, an address location and the control signals may be broadcast by the sending component 102 to the bridge 702 on 2 transmit sub-channels of the high performance bus within a single clock cycle. The bridge 702 may buffer and broadcast this information to the receiving component 104 over the 32-bit transmit channel 108' in two clock cycles. An 8-byte payload may then be broadcast from the receiving component 104 to the bridge 702 on the 32-bit receive channel 110', buffered in the bridge 702, and then broadcast by the bridge 702 to the sending component 102 on the two receive sub-channels 110a and 110b in a single clock cycle.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the sending and/or receiving component, or elsewhere. In the alternative, the processor and the storage medium may reside as discrete components in the sending and/or receiving component, or elsewhere.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of communicating over a bus, the method comprising:

transmitting first data and first address information from a sending component to a receiving component over a transmit channel of the bus and transmitting second data and second address information from the sending component to the receiving component over the transmit channel;

sending type data in type fields from the sending component to the receiving component, the type data communicated such that the receiving component can distinguish between the first data and the first address information and can distinguish between the second data and the second address information;

receiving read data from the receiving component, the read data sent over a receive channel of the bus;

repeating a transmission of the first data and first address information or the second data and second address information from the sending component to the receiving component when an acknowledgement is not received by the sending component from the receiving component; and limiting a number of repeat transmissions by the sending component when the acknowledgement is not received within a predetermined number of clock cycles, wherein the sending component is configured to send remaining write data from a pending write operation in place of an address location for an operation request.

2. The method of claim 1 wherein the first address information and the second address information are transmitted over the transmit channel during a common clock cycle.

3. The method of claim 1 further comprising signaling from the receiving component to the sending component to indicate when the receiving component is transmitting the read data.

4. The method of claim 3 further comprising transmitting commands on the receive channel from the receiving component, and signaling from the receiving component to the sending component such that the sending component can distinguish between the read data and the commands.

5. The method of claim 4 wherein the receive channel comprises a plurality of sub-channels.

6. The method of claim 1, further comprising determining a first number of sub-channels of the transmit channel that are available for transmission, wherein the first number of sub-channels is at least two.

7. The method of claim 6, further comprising determining a second number of sub-channels of the receive channel that are available for transmission of the read data, wherein the second number of sub-channels is at least two.

8. The method of claim 7, further comprising changing the first number of sub-channels.

9. The method of claim 8, further comprising changing the second number of sub-channels.

10. The method of claim 8, further comprising increasing the first number of sub-channels.

11. The method of claim 1, wherein the first data is communicated over a first sub-channel of the transmit channel and the second data is communicated over a second sub-channel of the transmit channel.

12. The method of claim 11, wherein at least a portion of the first data and the first address information is transmitted over the first sub-channel of the transmit channel and at least a portion of the second data and the second address information is transmitted over the second sub-channel of the transmit channel concurrently with the receipt of at least a portion of the read data.

13. The method of claim 11, wherein the first data is communicated by a payload over the first sub-channel.

14. The method of claim 13, wherein a transfer tag that identifies the payload is communicated over the transmit channel.

15. The method of claim 1, wherein the type data in at least one of the type fields changes between a data type and an address type on a rising edge of a shared reference clock signal.

16. The method of claim 1, further comprising sending transfer qualifiers over the transmit channel.

17. The method of claim 16, wherein the transfer qualifiers comprise a payload size.

18. The method of claim 1, wherein the operation request is one of a read operation request and a write operation request.

19. A processing system, comprising:
a bus having first and second channels; and
a sending component configured to transmit first data and first address information from the sending component to a receiving component over the first channel and to transmit second data and second address information from the sending component to the receiving component over the first channel;
wherein the receiving component is configured to store the first and second data transmitted on the first channel and to retrieve read data based on the first and second address information;
wherein the sending component is further configured to send type data in type fields to the receiving component, the type data communicated such that the receiving component can distinguish between the first data and the first address information and can distinguish between the second data and the second address information;
wherein the sending component is further configured to repeat a transmission of the first data and first address information or the second data and second address information from the sending component to the receiving component when an acknowledgement is not received by the sending component from the receiving component;
wherein the sending component is further configured to limit a number of repeat transmissions when the acknowledgement is not received within a predetermined number of clock cycles, wherein the sending component is further configured to send remaining write data from a pending write operation in place of an address location for an operation request.

20. The processing system of claim 19 wherein the receiving component is further configured to signal to the sending component to acknowledge the transmission on the first channel.

21. The processing system of claim 20 wherein the sending component further comprises an address back-off mechanism.

22. The processing system of claim 19 wherein the receiving component is further configured to signal the sending component to indicate when the receiving component is transmitting the read data.

23. The processing system of claim 22 wherein the receiving component is further configured to transmit commands on the second channel and signal to the sending component such that the sending component can distinguish between the read data and the commands.

24. The system of claim 19, wherein the first data is communicated over a first sub-channel of the transmit channel and the second data is communicated over a second sub-channel of the transmit channel.

25. The processing system of claim 24 wherein the sending component is further configured to transmit at least a portion of the first data and the first address information over the first sub-channel substantially concurrently with receiving at least a portion of the retrieved read data communicated over the second channel.

26. The system of claim 19, wherein each of the type data fields is a three bit data field.

27. The system of claim 19, wherein the operation request is one of a read operation request and a write operation request.

* * * * *